US007216169B2

(12) United States Patent
Clinton et al.

(10) Patent No.: US 7,216,169 B2
(45) Date of Patent: May 8, 2007

(54) METHOD AND SYSTEM FOR ADMINISTERING PERSONAL COMPUTER HEALTH BY REGISTERING MULTIPLE SERVICE PROVIDERS AND ENFORCING MUTUAL EXCLUSION RULES

(75) Inventors: Margaret R. Clinton, Sammamish, WA (US); Mark D. Zuber, Duvall, WA (US)

(73) Assignee: Microsoft Corporation, Redmond, WA (US)

( * ) Notice: Subject to any disclaimer, the term of this patent is extended or adjusted under 35 U.S.C. 154(b) by 527 days.

(21) Appl. No.: 10/611,486

(22) Filed: Jul. 1, 2003

(65) Prior Publication Data

US 2005/0021733 A1   Jan. 27, 2005

(51) Int. Cl.
 *G06F 15/173* (2006.01)
(52) U.S. Cl. .................... 709/224; 709/203; 709/221; 709/229; 719/318; 726/24; 726/25; 714/2; 714/25; 713/188
(58) Field of Classification Search ................ 709/203, 709/223–224, 229, 221, 318; 725/25, 26; 726/23, 24, 25; 713/188; 714/2, 25; 719/318
See application file for complete search history.

(56) References Cited

U.S. PATENT DOCUMENTS

| 6,182,134 | B1 * | 1/2001 | Collins et al. ............... 709/224 |
| 6,553,416 | B1 * | 4/2003 | Chari et al. .................. 709/224 |
| 7,002,921 | B2 * | 2/2006 | Mellquist et al. ........... 370/252 |
| 2002/0054169 | A1 * | 5/2002 | Richardson ................. 345/854 |
| 2002/0069271 | A1 * | 6/2002 | Tindal et al. ................ 709/221 |
| 2002/0133584 | A1 * | 9/2002 | Greuel et al. ................ 709/224 |
| 2003/0028332 | A1 * | 2/2003 | DiMaggio et al. ............. 702/35 |
| 2003/0191877 | A1 * | 10/2003 | Zaudtke et al. ............... 710/72 |
| 2003/0221002 | A1 * | 11/2003 | Srivastava et al. .......... 709/224 |
| 2004/0019803 | A1 * | 1/2004 | Jahn ........................... 713/201 |
| 2004/0083243 | A1 * | 4/2004 | Feng et al. .................. 707/203 |
| 2004/0109410 | A1 * | 6/2004 | Chase et al. ................. 370/229 |
| 2004/0117477 | A1 * | 6/2004 | Kaminsky et al. .......... 709/224 |
| 2004/0153748 | A1 * | 8/2004 | Fabrizi et al. ................ 714/10 |
| 2004/0158627 | A1 * | 8/2004 | Thornton ..................... 709/224 |
| 2004/0199681 | A1 * | 10/2004 | Hedtke ......................... 710/37 |
| 2005/0044209 | A1 * | 2/2005 | Doyle et al. ................. 709/224 |
| 2006/0156407 | A1 * | 7/2006 | Cummins ..................... 726/25 |

OTHER PUBLICATIONS

McAfee Security, "My Service Status" p. 1 of 1, retrieved from http://images.mcafee.com/common/screenshots/ msc_main_6965x540.gif on Jun. 28, 2003.

* cited by examiner

*Primary Examiner*—Oanh Duong
(74) *Attorney, Agent, or Firm*—Workman Nydegger

(57) ABSTRACT

A personal computer health administration framework is disclosed that includes a set of intercommunicating components. The system includes a provider subsystem that provides services relating to personal computer health status. The services include acquiring health status information relating to the operation of the personal computer. The system also includes a health engine subsystem that receives and processes the health status information acquired by the provider subsystem. The health engine subsystem thereafter renders health status notifications. A client user interface subsystem, consumes the notifications of the health engine subsystem and reports personal computer health status information to users in accordance with the health status notifications.

49 Claims, 4 Drawing Sheets

| | |
|---|---|
| 300 | Launch Health Engine |
| 310 | Health Score |
| 320 | StatusChanged |
| 322 | ScoreChanged |
| 324 | ProviderActivityChanged |
| 326 | TaskStateChanged |
| 330 | Add Provider |
| 332 | Remove Provider |
| 334 | Startup |
| 336 | Shutdown |
| 338 | AddBlockRule |
| 339 | MutexTasks |
| 340 | ExecuteHealthStatusItem |
| 342 | GetProviderActivityItem |
| 344 | CancelProviderActivityItem |
| 346 | GetHealthStatusItem |

FIG. 3

Actions You Need to Take

1. Safeguard Your Files It has been 7 days since your last backup. Backup now
2. Security settings in Internet Explorer are below the recommended level. Change Security Settings

METHOD AND SYSTEM FOR ADMINISTERING PERSONAL COMPUTER HEALTH BY REGISTERING MULTIPLE SERVICE PROVIDERS AND ENFORCING MUTUAL EXCLUSION RULES

FIELD OF THE INVENTION

This invention generally relates to the area of computer systems. More particularly, the present invention concerns computer system health administration, and in particular, methods and systems for monitoring a combination of system diagnostic and configuration information and rendering both health notifications and corrective actions to restore a computer system to good health status.

BACKGROUND OF THE INVENTION

Personal computer (PC) health includes a variety of features that gauge the reliability and safety of computer system resources including data, programs, and hardware. Examples of PC health features include security, privacy, virus protection, backup of programs and data, etc. Each of these features is typically administered, if at all, by a different PC health status provider. Thus, maintaining good PC health status requires a high degree of knowledge and attention by users to the various sources of the status information. If either is lacking, then there is a substantial likelihood that the user will be unaware when the computer system's health is poor. As a consequence, the data and programs of many individuals' computer systems are vulnerable to viruses, intrusions on privacy, data loss, etc. In view of the value and sensitivity of data and programs maintained on most users' computers (e.g., digital photo albums, music libraries, computer games, business software, etc.), the potential severity of loss is substantial.

The complexity of personal computer systems and their variety of uses has rendered the task of administering the operational health of such systems beyond the capabilities of the vast majority of users. In order to fully administer the health of a PC, a user must have an awareness of the needs of the PC with regard to a number of features/aspects of PC operation that contribute to overall PC health. However, due to the monumental nature of the task of administering PC health, most users do not adequately address this task until their failure to maintain a computer system's health leads to some form of catastrophic event such as a virus attack or theft of private information.

Previous attempts to address PC health have taken a limited, focused approach to monitoring and administering the issue of health of a computing system. In particular, individual applications tend to focus upon a particular feature, such as security, anti-virus protection, privacy, backups, etc. Such systems take an approach of focusing upon individual features and notifying users of the status of such features in isolation. A known security index rendering user interface provides a "Security Index" based upon a set of input sub-indexes including: antivirus, antihacker, antiabuse, and antispam. The interface also provides a "Service Status" menu identifying enabled and disabled features. The user interface, including links to a store for providing products that concern the components of the security index, suggests that this is a marketing tool for the products of a particular seller of software.

SUMMARY OF THE INVENTION

The present invention comprises a system for administering personal computer health status. Personal computer system health provides an overall measurement of personal computer operation in any of a variety of general areas of measurement including, for example: security, privacy, stability, backup, etc. Personal computer health status measurement and reporting goes beyond merely reporting a physical performance measurement such as CPU usage, available physical memory, and battery power level. Instead, personal computer health takes into consideration status information reported by a provider relating to an area of the operational health of a computer system and applies contextual information (e.g., is the personal computer in the network) to render a health score that indicates the level of severity, if any, of a personal computer system health issue.

In accordance with the present invention a system comprising a set of intercommunicating components administers the health of a personal computer. The system includes a provider subsystem that provides services relating to personal computer health status. The services include acquiring health status information relating to the operation of the personal computer. The system also includes a health engine subsystem that receives and processes the health status information acquired by the provider subsystem. The health engine subsystem thereafter renders health status notifications. A client user interface subsystem, consumes the notifications of the health engine subsystem and reports personal computer health status information to users in accordance with the health status notifications.

BRIEF DESCRIPTION OF THE DRAWINGS

While the appended claims set forth the features of the present invention with particularity, the invention, together with its objects and advantages, may be best understood from the following detailed description taken in conjunction with the accompanying drawings of which:

FIG. 3 is an exemplary set of interfaces supported by the health engine within a PC health maintenance framework embodying the present invention;

DETAILED DESCRIPTION OF THE DRAWINGS

Figure 1:
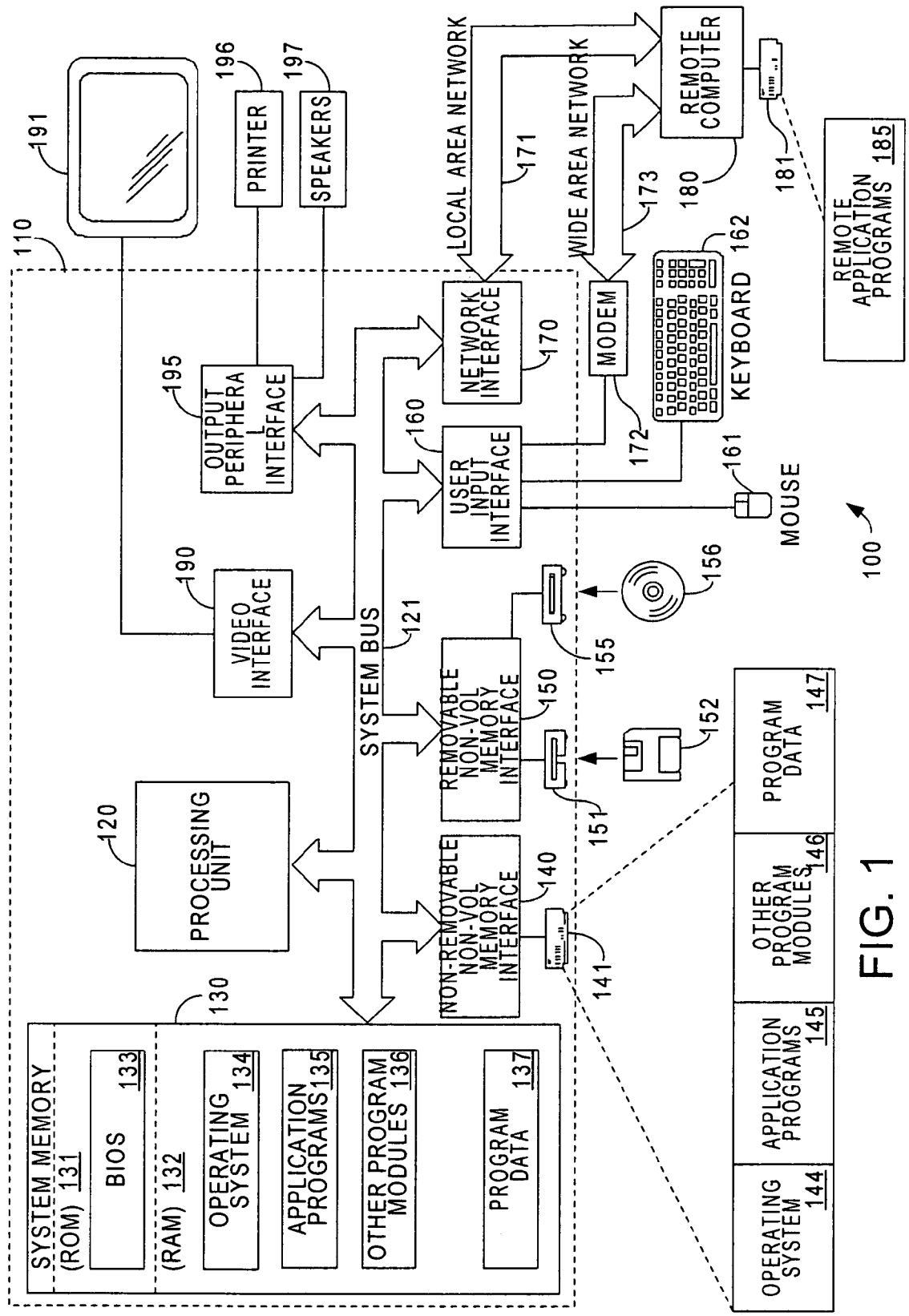
FIG. 1 is a simplified schematic illustrating an exemplary architecture of a computing device for carrying out the present invention.

In the illustrative embodiment of the present invention, a personal computer (PC) health administration framework facilitates monitoring, reporting, and requesting corrective actions with regard to various classes of health status of a personal computer. The PC health administration framework supports PC health card/report user interfaces that publish an overall measurement of a computer system's health as well as underlying contributors to the overall health and suggestions for corrective actions to improve the system's health, The exemplary PC health maintenance framework disclosed herein comprises a combination of interrelated subsystems having particularized roles in notifying PC users of overall PC health status (as well as contributing factors to the health status) as well as suggesting corrective actions—if any are needed. The system includes a set of provider services that provide particularized PC health status information to a health engine. The health engine applies health criteria and algorithms to the status information in real time to render PC health status notifications and suggested corrective actions (that can be immediately invoked if requested) to a client user interface supporting user interfaces that output the overall health status as well as contributing health features and corrective actions to improve PC health. The health engine receives, and passes back to the provider services (if allowed) corrective actions requested via the client user interface. Thus, the health engine also coordinates corrective actions to ensure that two selected corrective actions do not conflict.

The client user interface supports a variety of output modes. The Health Card user interface provides an at-a-glance status (e.g., a change in color of a display item) of the computer and calls out any issues that need user attention. The Health Report provides more detailed coverage and an explanation of the status of the computer. In addition to the score and issues the Health Card provides, the Health Report breaks down the overall score by category and then to specific measures. The PC Health Card/Report user interface makes recommendations on areas that need improvement and provides a means to fix issues immediately. It also generates/provides comparisons with past performance thereby providing immediate feedback regarding applied corrective actions as well as supporting both trending and regression analysis on the system over time. Furthermore, rather than comparing a current status to a prior status of a same PC, the system also supports comparing a health status of the computer with other computers in a "network." Finally, the score and measures can be calibrated to the type of use of the computer (for example, a small business work station, a computer shared by a family used primarily for communication, or a home gaming machine).

The PC Health Card/Report imparts confidence that the computer is secure and running at peak performance when the health score is good or alerts and educates the user about areas of improvement when appropriate. The user is thus assured of having a secure computing experience and that a personal computer is well maintained and will operate reliably under a currently sensed computing environment.

FIG. 1 illustratively depicts an example of a suitable operating environment 100 for carrying out the personal computer health administration framework in accordance with an embodiment of the present invention. The operating environment 100 is only one example of a suitable operating environment, and is not intended to suggest any limitation as to the scope of use or functionality of the invention. Other well known computing systems, environments, and/or configurations that may be suitable for use with the invention include, but are not limited to, personal computers, server computers, laptop/portable computing devices, multiprocessor systems, microprocessor-based systems, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention is potentially incorporated within network nodes operating in distributed computing environments where tasks are performed by remote processing devices that are linked through a communications network. In a distributed computing environment, program modules are generally located in both local and remote computer storage media including memory storage devices.

With continued reference to FIG. 1, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 140 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through an non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 20 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus, but may be connected by other interface and bus structures, such a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through a output peripheral interface 190.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between computers may be used.

Figure 2:
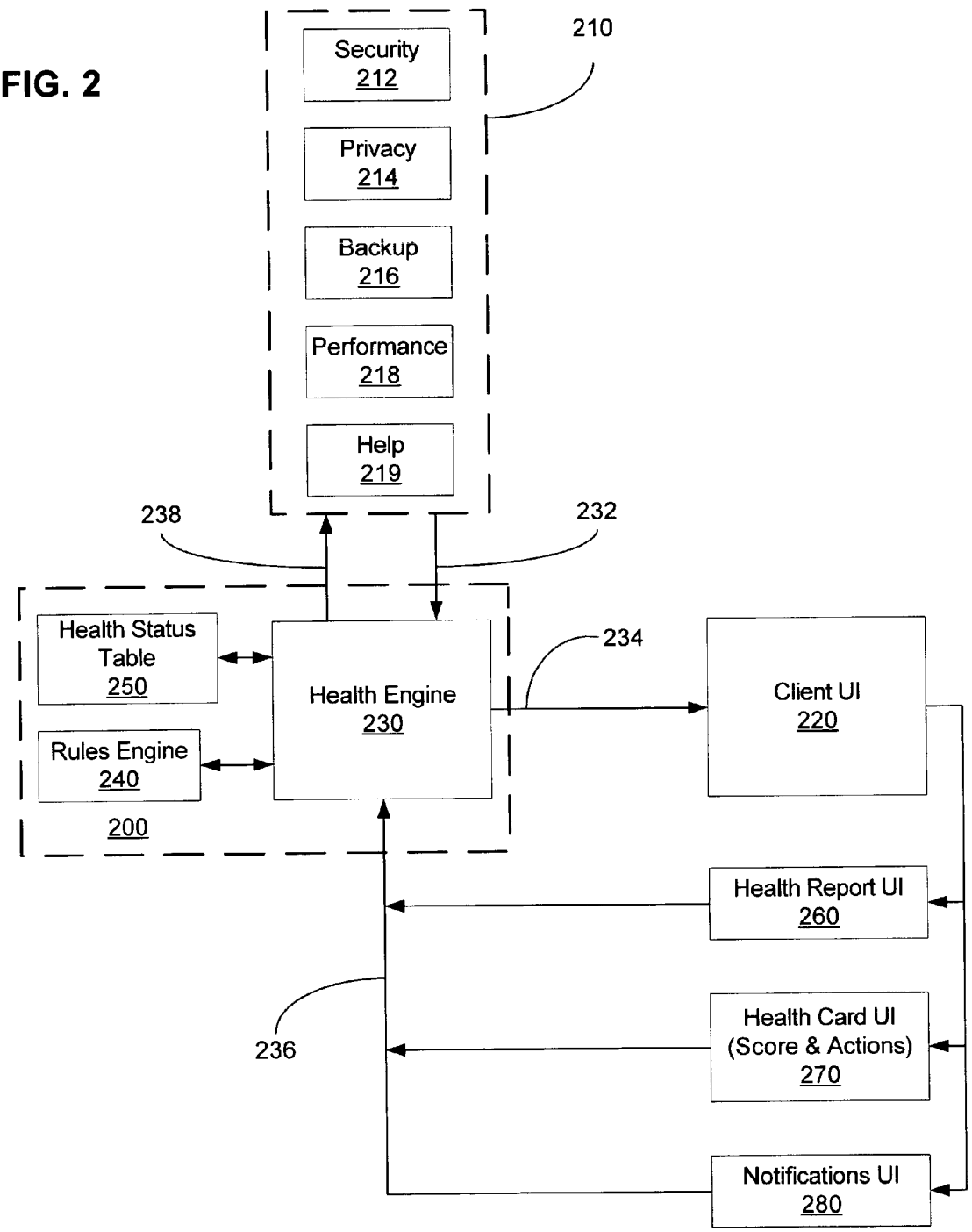
FIG. 2 is an exemplary functional block diagram depicting a set of components associated with a system for administering personal computer health on behalf of users in accordance with an embodiment of the invention.

Turning to FIG. 2, an exemplary personal computer health administration framework is schematically depicted. In an embodiment of the invention, the personal computer health administration framework is built around a health engine subsystem 200. The health engine subsystem 200 hosts a personal computer health service provider subsystem 210 comprising an extensible set of registered provider services. Registration can occur in a number of ways. In an embodiment of the invention, the individual service providers call a public method that notifies the health administration framework of their existence (e.g., service instance identification and type). Thus, any service provider is capable of registering existence and supplying health status information to the system through the standardized/published interface. Other aspects of the published interfaces are described herein below.

Furthermore, in an embodiment of the invention, a health engine 230 (or other suitable administrative entity) guards against destructive additions to the extensible set of provider services. For example, a registration entity can block the addition of a non-certified/unauthorized provider. After registration the health engine 230 filters suggested/requested actions to ensure that the actions do not conflict with other requests or the overall mission of the system—to maintain PC health status.

The extensible set of registered provider services renders health status information for various aspects of PC health. In the illustrative example depicted in FIG. 2, the set of provider services address a variety of aspects of PC health including: security (including virus detection) 212, privacy 214, backup 216, performance 218, help 219 (uses system crash information and provides customized responses, etc.), etc. Each of the provider services defines: operating parameters checked, logic performed to signal that something is wrong/failing, and remedial actions that address a health problem (part of the health status information passed to the health engine subsystem 200). The provider services obtain data from a variety of sources including: system drivers (e.g., every time a file is touched a notification is provided to an anti-virus provider), other applications (an anti-virus application), the Internet Protocol (IP) stack, performance counters, etc.

The health engine subsystem 200 operates as a bi-directional communications conduit between the PC health service provider subsystem 210 and a client user interface (UI) subsystem 220. In an embodiment of the invention, a health engine 230 within the health engine subsystem 200 includes interface logic for coordinating the passage of information and/or requests between the PC health service provider subsystem 210 and the client user interface subsystem. A provider status information interface of the health engine 230 (represented by line 232) receives health status information from the provider subsystem 210. After performing intermediate processing of the health status information, the health engine 230 passes, via a client interface (represented by line 234), health status notifications. A client input interface (represented by line 236) of the health engine 230 receives requests for corrective actions issued by the client user interface subsystem 220 arising from the health status notifications passed to the client UI subsystem 220 via the client interface. After performing intermediate processing of received requests for corrective actions, the health engine 230 passes, via a provider action interface (represented by line 238), instructions for corrective actions to a consumer of corrective actions. In an embodiment of the invention, the consumers of instructions for corrective actions include one or more of the set of provider services within the provider subsystem 210.

Thus, in a configuration having basic functionality the health engine 230 operates as an aggregator of messages in both directions between providers and client user interfaces. The intermediate processing is generally confined to generating an overall index value from a set of input health scores submitted by one or more providers. The health engine 230 also accumulates requests for corrective actions and issues non-destructive instructions for corrective action.

However, in an embodiment of the invention the health engine 230 applies decision logic for coordinating execution of requested corrective actions across multiple tasks and/or multiple providers. The health engine subsystem 200 applies algorithms associated with reporting health notification information to clients and instructing the provider services to take corrective action. These tasks were referred to above as "intermediate processing." A rules engine 240 applies a customizable set of rules governing the formulation of: (1) health status notifications for the client UI subsystem 220 (including suggestions for corrective actions to be presented to a user), and (2) instructions for corrective action submitted by the health engine 230 back to an appropriate consumer (e.g., one of the provider services registered within the provider subsystem 210.

The following examples illustrate the "coordinating" aspects of an embodiment of the invention. As mentioned above, task execution is coordinated by the health engine 230 to ensure that two requested actions do not render an overall negative result. In the case of two conflicting remedial actions (if carried out together rather than sequentially), the health engine imposes a mutual exclusion algorithm. An example of such actions is a backup to CD and installation of a new program (the backup on the CD will be corrupted by the install process). The system carries out the mutual exclusion relationship by determining and disabling all actions that are inconsistent with a currently executing action.

In yet another embodiment of the invention, the health engine 230 coordinates remedial actions with the status of the overall system (not just the corrective actions currently being taken) to minimize the impact on the user experience while the corrective action is taking place. An example of such a factor is the current state of executing programs. Such coordination would prevent execution of an antivirus scan while the user is playing a game. On the other hand, the antivirus scan could be triggered by activation of screen saver (indicating lack of use).

A substantial distinction exists between the personal computer health administration framework described herein and previously known applications that operate self-contained health status measures (e.g., a notification by an anti-virus program that its virus list needs to be updated). In particular, the health engine 230 is situated at a position within the health status administration framework that facilitates aggregating/coordinating the health status information obtained from multiple provider services to formulate a health status/corrective action decision. Thus, the health engine 230 applies health administration criteria (both diagnostic and remedial) to status information from a variety of sources, including the current configuration of the computer system and health status information from multiple, distinct, provider services, to provide a generalized, overall health report as well as a set of potential remedial actions.

In accordance with a particular embodiment of the present invention, the rules engine 240, in addition to being able to render health status for single providers (or factors contributing to a health status of a single provider, applies information outside the information provided by a first provider service to render (or tune) a personal computer health score and any instructions/suggestions for corrective action for the first provider. In particular, the rules engine 240 applies status information provided by at least a second provider as well as the first provider to render the instruction for corrective action. By way of example, a firewall provider and an anti-virus provider operate independently of one another. However, in the event of failure, the rules engine 240 takes into account the health status information provided by both providers when rendering instructions for corrective actions to each. Furthermore, in an embodiment of the invention, the rules engine 240 formulates a health status score/suggested corrective action based upon usage/configuration information (e.g., standalone, networked, etc.). For example, if a computer is operating in a standalone configuration, then firewall status is not relevant to an overall safety score for the system.

In accordance with a particular embodiment of the present invention, the rules engine 240, in addition to being able to render health status for single providers (or factors contributing to a health status of a single provider), applies information outside the information provided by a first provider service to render (or tune) a personal computer health score and any instructions/suggestions for corrective action for the first provider. In particular, the rules engine 340 applies status information provided by at least a second provider as well as the first provider to render the instruction for corrective action. By way of example, a firewall provider and an anti-virus provider operate independently of one another. However, in the event of failure, the rules engine 240 takes into account the health status information provided by both providers when rendering instructions for corrective actions to each. Furthermore, in an embodiment of the invention, the rules engine 240 formulates a health status score/suggested corrective action based upon usage/configuration information (e.g., standalone, networked, etc.). For example, if a computer is operating in a standalone configuration, then firewall status is not relevant to an overall safety score for the system.

In a particular embodiment of the invention the health status table 250 specifies instructions for corrective action to be submitted by the health engine 230 to the provider subsystem 210 in response to detecting an existing problem. Such instructions for corrective action are based, for example, upon: a current problem determined by the rules engine 240 in view of received status information and/or a request for corrective action selected by a user and received from the client UI subsystem 220. The health engine 230 need not rely upon requests from the client UI subsystem 220. Instead, the health engine 230 acts upon a detected problem by rendering an automated response (based upon the rules engine 240 and/or the health status table 250). An actual remedial action is invoked by the health engine 230

(i.e., an automatic fix that is invoked either with or without a user's express request). Upon completion of a corrective action, the affected provider(s) report their new status to the health engine 230, and the new PC health status information is then passed to the client UI subsystem 220.

Turning to FIG. 3, a set of exemplary methods associated with the health engine-based PC health administration framework are listed. A LaunchHealthEngine method 300 starts up an instance of the health engine subsystem 200. The health engine subsystem 200 carries out a variety of health status and remedial tasks. As mentioned previously above such tasks include aggregating health scores and items that make up the scores across all registered providers. The health engine subsystem 200 also aggregates the current activities being carried out (to enforce mutual exclusion where needed). As will be explained herein below, the health engine fires notification events informing interested parties (e.g., the client user interface 220) when a score, health status, or provider activity changes.

A HealthScore method 310 on the health engine 230 provides an overall health score for the system based upon the inputs of all the providers. In an embodiment of the invention, an extensible set of such methods is supported for a set of customized aggregate scores rendered by the health engine 230. Such interface can be registered upon startup of the health engine and published for the client UI 220.

Next, the health engine 230 fires a set of events that constitute notifications to the client UI 220 regarding health status information. A StatusChanged event 320 is raised by the health engine to notify clients of a potential change in status regarding items of health status information maintained by one or more providers. A ScoreChanged event 322 is raised when an aggregate health score (e.g., the score provided by HealthScore method 310) generated by the health engine subsystem 200 has changed. A ProviderActivityChanged event 324 is raised when the activity within a provider has changed (the provider started/stopped performing an activity). A TaskStateChanged event 326 is raised when a task (corrective action) for a provider changes state.

The next set of four listed methods is called to administer the set of providers associated with the event handler system 200. An AddProvider method 330 registers a provider from the provider subsystem 210 to the set of providers handled by the health engine subsystem 200. A RemoveProvider method 332 deregisters a previously added provider. After registration, a provider is activated by invoking a Startup method 334. Once activated, the provider can enumerate health status items (and their current values), enumerate the provider's tasks, specify any actions currently being taken, and receive an instruction to take an action. A Shutdown method 336 deactivates the provider.

In an embodiment of the invention, the providers are able to specify certain rules governing how/what/when actions can be submitted by the health engine 320 to the provider subsystem. A provider calls an AddBlockRule method 338 on the health engine 320 to specify a rule applied by the health engine subsystem 200 (e.g., the rules engine 240). Furthermore, a MutexTasks method 339 specifies to the health engine 320 certain tasks that are mutually exclusive (and thus the health engine must time execution of the mutually exclusive tasks to occur sequentially). This rule is passed on to the client UI 220 for graying out a field that cannot occur while a certain action is executing.

Next, the health engine 230 supports a set of calls made by the client UI 220. An ExecuteHealthStatusItem method 340 enables the client UI 220 to request a corrective action to be passed by the health engine 230 to a provider for a particular status item. Such actions (e.g., execute virus update) are attached to notifications provided by the health engine 230 to the client UI 222 and are thereafter selected by users.

A GetProviderActivityItem 342 aggregates all the current action items for all providers. If a particular provider does not report any activity items, then the provider is assumed to be idle. A CancelProviderActivityItem 344 halts any current action specified in the action (e.g., halt a virus scan). Finally, a GetHealthStatusItem method 346 is invoked on the health engine 230 to cause retrieval of all the health status items supported by each of the providers in the provider subsystem 210. The responses potentially list any available corrective actions.

It is emphasized that the above-described interface is exemplary. As those skilled in the art will readily appreciate, there are a variety of ways to carry out the functionality of the health engine interface and its associated methods, events, etc. Therefore, the disclosure of this example should not be taken as limiting the invention to a particular set of methods and functions described herein above.

Figure 4:
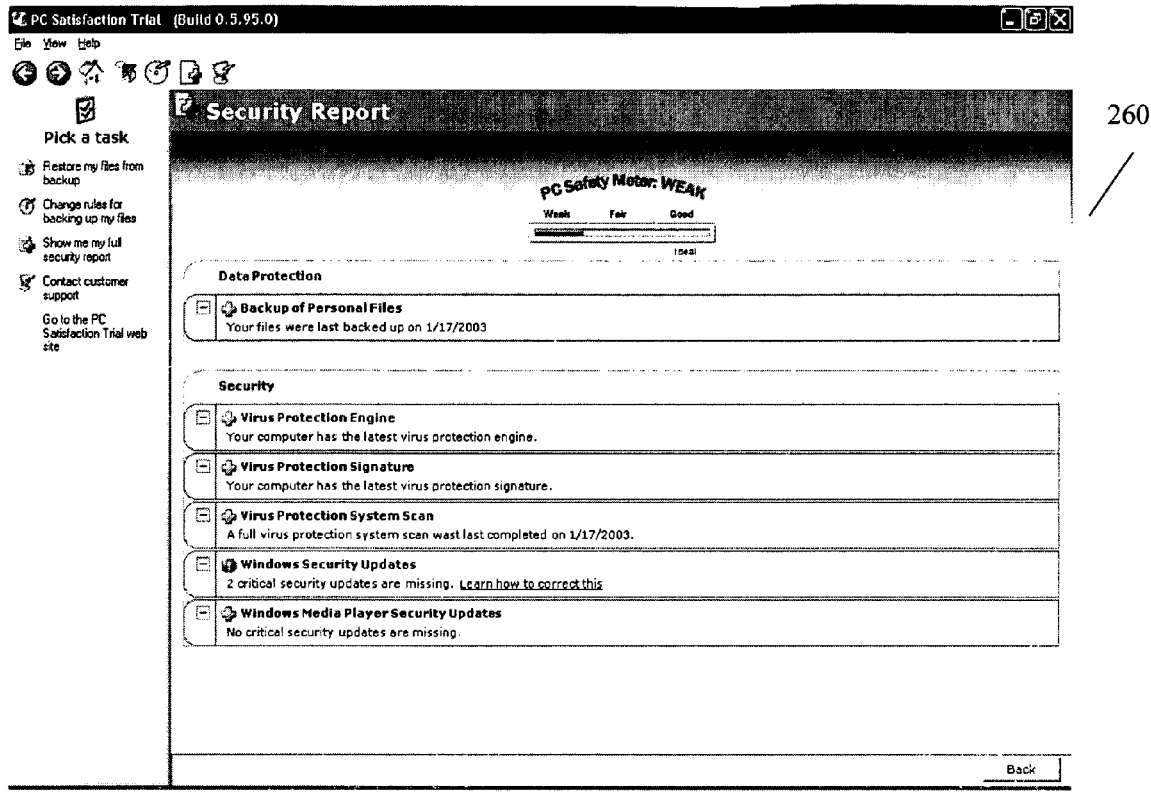
FIG. 4 is an exemplary user interface for a health report user interface supported by a client user interface subsystem of a personal computer health administration system embodying the present invention.

The health status of the personal computer system is rendered for viewing by a user through the client UI subsystem 220 that supports an extensible set of user interfaces. A health report UI 260 depicted, by way of example in FIG. 4, includes a graphical output enumerating a set of components that make up each of a set of supported aspects/features (e.g., backup, security, firewall, anti-virus) of personal computer health status. The health report UI 260 includes all statuses—not just the warnings—as well as an overall health status/score. For each provided aspect, the health report UI 260 provides a title, a score (e.g., + or −), information about the aspect, summary results, and a link to a "fix action" that is activated if needed/recommended. The overall health status/score is generated by the health engine 230 based upon an algorithm provided by the rules engine 240.

Figure 5:
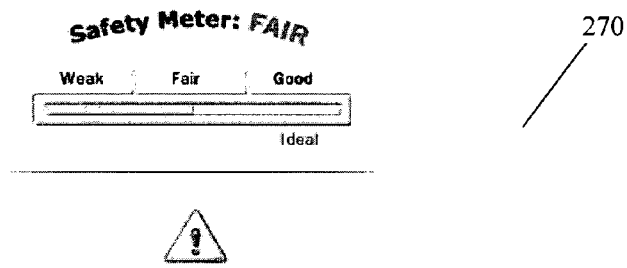
FIG. 5 is an exemplary user interface for a health card user interface supported by a client user interface subsystem of a personal computer health administration system embodying the present invention.

A health card UI 270 depicted, by way of example in FIG. 5, specifies an overall health (e.g., safety) score/meter for the personal computer and enumerates a set of user selectable remedial action items/actions for raising the PC health score. The health (safety) score depicted in FIG. 5 is generated by the health engine 230 based upon aggregated health status information provided by multiple providers including, for example, anti-virus, backup, security and firewall provider services. In the illustrative example set forth in FIG. 5, the user is prompted to update backup files (initiated by invoking the "Backup now" response), and raise the level of Internet security settings (initiated by invoking the "Change Security Settings" response).

In an embodiment of the invention, the health card UI 270 comprising a set of provider services of various types (see, e.g., FIG. 2) generates an overall health score for the computer system based upon combinations of the various providers. In addition, each of the providers (e.g., security) comprises a set of factors (each providing an individual score) that are combined to render a composite score for that provider. Furthermore, customized combinations of scores associated with particular providers are combined to render a thematic composite score (e.g., a combination of factors from security and privacy are combined to render an "Internet Health" score.). The underlying logic for combining such scores if executed, by way of example, by the rules engine 240 of the health engine subsystem 200.

A notifications interface 280 issues proactive, unsolicited, asynchronous warnings in the form of, for example, pop-up dialog boxes. The notifications are used, by way of example, to warn a user when the health of the personal computer (as measured by one or more of the provider services) is dangerously poor and thus immediate corrective action needs to be taken by a user to avoid damaging (or further damage to) the personal computer system. Each of the above-described user interfaces supported by the client UI subsystem 220 is also capable of presenting a remedial action and receiving a response from a user seeking to invoke the remedial action. As mentioned previously above, the health engine 230 receives the request for corrective action and issues an instruction to take correction action to the appropriate provider service within the provider subsystem 210. The set of exemplary user interfaces supported by the client UI subsystem 220 includes alternative user interfaces in alternative embodiments of the invention.

It will be appreciated by those skilled in the art that a new and useful method and framework for administering personal computer health has been described herein. In view of the many possible computing environments to which the principles of this invention may be applied and the flexibility of designing and carrying out software development/performance evaluation tools, it should be recognized that the embodiments described herein are meant to be illustrative and should not be taken as limiting the scope of invention. Those skilled in the art to which the present invention applies will appreciate that the illustrated embodiments can be modified in arrangement and detail without departing from the spirit of the invention. Therefore, the invention as described herein contemplates all such embodiments as may come within the scope of the following claims and equivalents thereof.

What is claimed is:

1. A system for administering personal computer health status so as to provide an extensible framework in which multiple service providers can each monitor different aspects of personal computer health and provide the results to an end-user of a personal computer in a single, cohesive interface, the system being embedded in a computer readable storage media and comprising:

a provider subsystem for providing services relating to the personal computer health status, wherein the services include acquiring health status information of the personal computer;

a health engine subsystem for processing the health status information acquired by the provider subsystem and rendering health status notifications, the health engine subsystem comprising an open framework having a standardized interface allowing external service providers to each register one or more provider modules with the health engine subsystem and thereby including multiple registered provider modules from multiple external service providers within the provider subsystem, each provider module of an external service provider acquiring the health status information for a particular aspect of personal computer health, the particular aspect being different from aspects of personal computer health acquired by other provider modules, wherein the health engine subsystem comprises task execution logic for enforcing mutual exclusion rules regarding execution of tasks by a consumer of corrective actions to be taken to improve the personal computer health; and a client user interface subsystem for reporting overall health status of the personal computer to the end-user of the personal computer on a per computer basis and in accordance with the health status notifications, wherein the client user interface subsystem reports to the end-user corrective actions for improving the health of the personal computer, and wherein enforcing the mutual exclusion rules comprises determining that two tasks of the tasks cannot be performed simultaneously and while displaying the two tasks to the end-user of the personal computer, disabling execution of one of the two tasks in a client interface displaced to the end-user.

2. The system of claim 1 further comprising a provider interface for passing an instruction for corrective action from the health engine subsystem to the end-user of corrective actions.

3. The system of claim 2 wherein the consumer of corrective actions is a provider service within the provider subsystem.

4. The system of claim 2 wherein the health engine subsystem comprises rules logic for specifying the instruction for corrective action.

5. The system of claim 4 wherein the health engine subsystem specifies the instruction for corrective action automatically based upon the rules of logic.

6. The system of claim 4 wherein the rules logic specifies an action based upon health status information originating from multiple providers within the provider subsystem.

7. The system of claim 1 wherein the health engine subsystem comprises a client interface for receiving a request for corrective action from the client user interface subsystem.

8. The system of claim 1 wherein the health engine subsystem comprises a health status information store for maintaining records corresponding to the health status information.

9. The system of claim 1 wherein the provider subsystem includes a security health status provider module.

10. The system of claim 1 wherein the provider subsystem includes a privacy health status provider module.

11. The system of claim 1 wherein the provider subsystem includes a backup health status provider module.

12. The system of claim 1 wherein the provider subsystem includes a performance provider module.

13. The system of claim 1 wherein the client user interface subsystem supports a user interface providing a health status score and a user selectable corrective action returned to the health engine subsystem.

14. A system as recited in claim 1, wherein the health engine subsystem is configured to receive, from the multiple provider modules, remedial actions to be performed at the personal computer to improve the overall health of the personal computer, and wherein the health system is adapted to filter the remedial actions and ensure that remedial actions from one provider module do not conflict with remedial actions from a second provider module.

15. A system as recited in claim 1, wherein the personal computer is in a standalone configuration.

16. The system of claim 1, wherein task execution coordination logic for enforcing mutual exclusion rules comprises the health engine subsystem applying a mutual exclusion algorithm to ensure that two recommended remedial actions do not render an overall negative result.

17. The system of claim 16, wherein the mutual exclusion algorithm times mutually exclusive remedial actions to occur sequentially.

18. The system of claim 1, wherein the client user interface subsystem displays unsolicited pop-up warnings to the end-user of the personal computer when the health status of the personal computer is determined to be dangerously poor by one or more of the provider modules.

19. The system of claim 1, wherein the multiple registered provider modules each provide a score for a respective aspect of the health of the personal computer monitored by each provider module, and wherein the overall health status of the personal computer is a composite score based on the scores of each of the multiple registered provider modules.

20. The system of claim 1, wherein the open framework is configured to allow registration of multiple registered provider modules that include at least backup, security, firewall and anti-virus modules.

21. A method for administering personal computer health status so as to provide an extensible framework in which multiple service providers can each monitor different aspects of personal computer health and provide the results to an end-user of a personal computer in a single, cohesive interface, the method comprising the steps of:
providing, by a provider subsystem, services relating to personal computer health status, wherein the services include acquiring health status information of the personal computer;
processing, by a health engine subsystem, the health status information acquired by the provider subsystem and rendering health status notifications, the health engine subsystem comprising an open framework having a standardized interface allowing external service providers to each register one or more provider modules with the health engine subsystem and thereby including multiple registered provider modules from multiple external service providers within the provider subsystem, each provider module of an external service provider acquiring the health status information for a particular aspect of personal computer health, the particular aspect being different from aspects of personal computer health acquired by other provider modules, wherein the health engine subsystem comprises task execution logic for enforcing mutual exclusion rules regarding execution of tasks by a consumer of corrective actions to be taken to improve the personal computer health ;
reporting, by a client user interface subsystem, overall health status of the personal computer to the end-user of the personal computer on a per computer basis and in accordance with the health status notifications; and
displaying to the end-user, by the client user interface subsystem, tasks indicative of corrective actions for improving the health of the personal computer, and wherein enforcing the mutual exclusion rules comprises determining that two tasks of the tasks cannot be performed simultaneously and while displaying the tasks to the end-user of the personal computer, disabling execution of one of the two tasks in a client interface displayed to the end-user.

22. The method of claim 21 further comprising the step of:
passing, by a provider interface, an instruction for corrective action from the health engine subsystem to end-user of corrective actions.

23. The method of claim 22 wherein the consumer of corrective actions is a provider service within the provider subsystem.

24. The method of claim 22 further comprising the step of:
specifying, by rules logic, the instruction for corrective action.

25. The method of claim 24 wherein the specifying step is performed automatically based upon the rules logic.

26. The method of claim 24 wherein the specifying step is performed based upon health status information originating from multiple providers within the provider subsystem.

27. The method of claim 21 further comprising the step of:
receiving, by a client interface of the health engine subsystem, a request for corrective action from the client user interface subsystem.

28. The method of claim 21 further comprising the step of:
maintaining, by a health status information store of the health engine subsystem, records corresponding to the health status information.

29. The method of claim 21 further comprising the step of:
providing, by a user interface of the client user interface subsystem, a health status score and a user selectable corrective action returned to the health engine subsystem.

30. A method as recited in claim 21, wherein reporting the personal computer health status to a user further includes providing a comparison of current performance with past performance of the same personal computer.

31. A method as recited in claim 21, wherein reporting the personal computer health status to a user further includes providing a comparison with a health status of at least one other computer in a network.

32. A method as recited in claim 22, further comprising:
coordinating, by the health engine subsystem, corrective actions with a current use status of the personal computer.

33. A method as recited in claim 21, further comprising:
invoking, by the health engine subsystem, an automatic corrective action to a detected problem, without the user's request for the corrective action.

34. A computer-readable storage medium including computer-executable instructions for administering personal computer health status so as to provide an extensible framework in which multiple service providers can each monitor different aspects of personal computer health and provide the results to an end-user of a personal computer in a single, cohesive interface, the computer-executable instructions, being executed by a computer, performing the steps of:
providing, by a provider subsystem, services relating to the personal computer health status, wherein the services include acquiring health status information of the personal computer;
processing, by a health engine subsystem, the health status information acquired by the provider subsystem and rendering health status notifications, the health engine subsystem comprising an open framework having a standardized interface allowing external service providers to each register one or more provider modules with the health engine subsystem and thereby including multiple registered provider modules from multiple external service providers within the provider subsystem, each provider module of an external service provider acquiring the health status information for a particular aspect of personal computer health, the particular aspect being different from aspects of personal computer health acquired by other provider modules, wherein the health engine subsystem comprises task execution logic for enforcing mutual exclusion rules regarding execution of tasks by a consumer of corrective actions to be taken to improve the personal computer health;
reporting, by a client user interface subsystem, overall health status of the personal computer to the end-user of the personal computer on a per computer basis and in accordance with the health status notifications; and
displaying to the end-user, by the client user interface subsystem, tasks indicative of corrective actions for improving the health of the personal computer, and wherein enforcing the mutual exclusion rules comprises determining that two tasks of the tasks cannot be performed simultaneously and while displaying the tasks to the end-user of the personal computer, disabling execution of one of the two tasks in a client interface displayed to the end-user.

35. The computer-readable medium of claim 34 further comprising computer-executable instructions facilitating performing the step of:

passing, by a provider interface, an instruction for corrective action from the health engine subsystem to a the end-user of corrective actions.

36. The computer-readable medium of claim 35 wherein the consumer of corrective actions is a provider service within the provider subsystem.

37. The computer-readable medium of claim 35 further comprising computer-executable instructions facilitating performing the step of:

specifying, by rules logic, the instruction for corrective action.

38. The computer-readable medium of claim 37 wherein the specifying step is performed automatically based upon the rules logic.

39. The computer-readable medium of claim 37 wherein the specifying step is performed based upon health status information originating from multiple providers within the provider subsystem.

40. The computer-readable medium of claim 34 further comprising computer-executable instructions facilitating performing the step of:

receiving, by a client interface of the health engine subsystem, a request for corrective action from the client user interface subsystem.

41. The computer-readable medium of claim 34 further comprising computer-executable instructions facilitating performing the step of:

maintaining, by a health status information store of the health engine subsystem, records corresponding to the health status information.

42. The computer-readable medium of claim 34 further comprising computer-executable instructions facilitating performing the step of:

providing, by a user interface of the client user interface subsystem, a health status score and a user selectable corrective action returned to the health engine subsystem.

43. The computer-readable medium of claim 34 further comprising computer-executable instructions facilitating performing the step of:

supporting, by an interface of the health engine subsystem, an extensible set of providers within the provider subsystem.

44. A system for administering personal computer health status so as to provide an extensible framework in which multiple service providers can each monitor different aspects of personal computer health and provide the results to an end-user of a personal computer in a single, cohesive interface, the system being embedded in computer readable storage media and comprising:

means for providing, by a provider subsystem, services relating to the personal computer health status, wherein the services include acquiring health status information of the personal computer;

means for processing, by a health engine subsystem, the health status information acquired by the provider subsystem and rendering health status notifications, the health engine subsystem comprising an open framework having a standardized interface allowing external service providers to each register one or more provider modules with the health engine subsystem and thereby including multiple registered provider modules from multiple external service providers within the provider subsystem, each provider module of an external service provider acquiring the health status information for a particular aspect of personal computer health, the particular aspect being different from aspects of personal computer health acquired by other provider modules, wherein the health engine subsystem comprises task execution logic for enforcing mutual exclusion rules regarding execution of tasks by a consumer of corrective actions to be taken to improve the personal computer health;

means for reporting, by a client user interface subsystem, overall health status of the personal computer to the end-user of the personal computer on a per computer basis and in accordance with the health status notifications; and means for displaying to the end-user, by the client user interface subsystem, tasks indicative of corrective actions for improving the health of the personal computer, and wherein enforcing the mutual exclusion rules comprises the health engine determining that two tasks cannot be performed simultaneously and while displaying the tasks to the end-user of the personal computer, disabling execution of one of the two tasks in a client interface displayed to the end-user.

45. The system of claim 44 further comprising:

means for passing, by a provider interface, an instruction for corrective action from the health engine subsystem to the end-user of corrective actions.

46. The system of claim 45 wherein the consumer of corrective actions is a provider service within the provider subsystem.

47. The system of claim 44 further comprising:

means for receiving a request for corrective action from the client user interface subsystem.

48. The system of claim 44 further comprising:

means for maintaining records corresponding to the health status information.

49. The system of claim 44 further comprising:

means for providing a health status score and a user selectable corrective action returned to the health engine subsystem.

* * * * *